United States Patent [19]

Asano

[11] Patent Number: 4,819,100

[45] Date of Patent: Apr. 4, 1989

[54] FLOATING HEAD SLIDER DEVICE FOR MAGNETIC DISK APPARATUS

[75] Inventor: Isao Asano, Furukawa, Japan

[73] Assignee: Alps Electric Co., Ltd., Japan

[21] Appl. No.: 83,798

[22] Filed: Aug. 7, 1987

[30] Foreign Application Priority Data

Sep. 24, 1986 [JP] Japan .................. 60-223873
Apr. 14, 1987 [JP] Japan .................. 61-89836

[51] Int. Cl.$^4$ .......................... G11B 5/55; G11B 17/32
[52] U.S. Cl. .................................. 360/97.01; 360/86; 360/106
[58] Field of Search ............... 360/103–106, 360/97, 98, 86, 77, 78, 109

[56] References Cited

U.S. PATENT DOCUMENTS

| | | | |
|---|---|---|---|
| 4,388,655 | 6/1983 | Zenzefilis | 360/97 X |
| 4,620,251 | 10/1986 | Gitzendanner | 360/103 |
| 4,633,343 | 12/1986 | Maury et al. | 360/78 X |
| 4,669,004 | 5/1987 | Moon et al. | 360/77 |
| 4,688,119 | 8/1987 | Blessum | 360/77 |
| 4,713,703 | 12/1987 | Asano | 360/97 |

FOREIGN PATENT DOCUMENTS

| | | | |
|---|---|---|---|
| 0162614 | 11/1985 | European Pat. Off. | 360/106 |
| 57-20963 | 2/1982 | Japan | 360/103 |
| 61-246974 | 11/1986 | Japan | 360/103 |

OTHER PUBLICATIONS

Heath, "Design of a Swinging Actuator for a Disk File," IBM Journal of Research and Development, vol. 20, No. 4, pp. 389–397, Jul. 1976.

*Primary Examiner*—John H. Wolff
*Attorney, Agent, or Firm*—Guy W. Shoup; Paul J. Winters; David W. Heid

[57] ABSTRACT

In a magnetic disk apparatus adapted such that a magnetic disk made of a hard disk type carrier with a magnetic recording region formed on the surface thereof is rotated in a high speed therein, air is introduced between its slider formed integral with a magnetic head and the magnetic disk, whereby the magnetic head is floated over the magnetic disk and allowed to write data on the magnetic recording layer or read data written on the magnetic recording layer, the magnetic disk apparatus is disclosed wherein the angle of obliquity of the main axis of the slider at the innermost circumferential portion of the recording region with respect to the radial direction of the magnetic disk is set to such angle as will bring the floating height of the edge portion of the slider toward the center of the magnetic disk and the floating height of the edge portion thereof toward the outermost circumference are virtually equal to each other.

7 Claims, 3 Drawing Sheets

FLOATING HEAD SLIDER DEVICE FOR MAGNETIC DISK APPARATUS

BACKGROUND OF THE INVENTION

1. Field of the Invention

The present invention relates to a magnetic disk apparatus for writing/reading data on a magnetic disk and more particularly to a magnetic disk apparatus called a hard disk apparatus or a Winchester type disk drive apparatus.

2. Description of the Prior Art

There is a magnetic disk apparatus adapted such that a magnetic disk made of a hard disk type carrier with a magnetic recording layer formed on the surface thereof is rotated in a high speed therein, air is introduced between its slider formed integral with a magnetic head and the magnetic disk, whereby the magnetic head is floated over the magnetic disk and allowed to write data on the magnetic recording layer or read data written on the magnetic recording layer.

The magnetic disk apparatus of the described type (hereinafter to be called the hard disk apparatus) is principally made up of a magnetic disk provided with a recording region thereon within a predetermined width in its radial direction, a slider formed integral with a magnetic head whose core is placed in a coil, a spindle motor for rotationally driving the magnetic disk, a head drive mechanism for shifting the magnetic disk to a desired track position of the magnetic disk, and a housing for housing these components.

As an example of the mentioned type of the hard disk apparatus, there is one which is disclosed in Publication of European Patent Application No. 0 162 614. The invention, in an apparatus for supporting a transducer in the operating and sensing position over a recording medium, comprising a slider having a transducer attached thereto and having a main axis extending virtually tangent to the track to be read at the center of the recording medium, an arm assembly movable around a pivot, and suspension means attached to the arm assembly and the slider for holding the slider on the arm assembly so that the main extra extends through the pivot.

And it is disclosed therein that, in order to maintain the alignment of the transducer gap with the slider which carries the transducer tangent to the track, it is attempted that the relative angle between the tangent at the point on the track to be read and the main axis of the transducer is kept within a small range of variation as the head moves from the innermost to the outermost track, and to achieve this it is designed such that the angle between the main axis of the slider and the tangent to the innermost or outermost track will not be greater than 13 degrees.

Further, in order to minimize the head/track angle while providing the maximum arm stiffness with minimum inertia, two arms rotating around the common junction point of the two arms are used. These two arms are mounted at an acute angle. The distal end of the first arm is stepped by a stepping motor connected to the end of the arm. The distal end of the second arm carries the slider and transducer.

In the hard disk apparatus as described above, however, since the circumferential speed of the magnetic disk is larger on the outer circumferential side than on the inner circumferential side, in the case, for example, where the lengthwise direction of the slider is arranged virtually perpendicular to the radial direction of the magnetic disk, the floating height of the slider becomes larger at its outer edge to face on the outer circumference of the magnetic head than at its inner edge facing on the inner circumference. If, in this way, the slider is floated and inclined to the inner circumferential side, in the case where the circumferential speed at the innermost portion of the recording region becomes smaller as the magnetic disk is made smaller along with the development of higher recording density, that is, the floating height of the slider becomes very small at the portion under consideration, there arises a problem that the inner edge of the slider would collide with the surface of the magnetic disk in rotation thereby to damage the recording layer.

And, even if arrangement is made as in the above described hard disk apparatus such that the relative angle between the tangent at the point on the track to be read and the transducer, that is, the main axis of the slider, is kept within a small range of variation as the head moves from the innermost to the outermost track, and to achieve this, if it is designed such that the angle between the main axis of the slider and the tangent to the innermost or outermost track will not be greater than 13 degrees, there still is estimated totally 25 degrees of variation. Thus, in the case where the recording density is made higher, the detection output becomes smaller, and a problem is encountered in reading/writing.

STATEMENT OF OBJECT

The present invention has been made in view of the above described technical background, and an object of this invention is to provide a magnetic disk apparatus free from collision of its slider with the magnetic disk and resulting damage to be caused on the record even if the magnetic disk is made smaller in diameter. Another object of this invention is to provide a magnetic disk apparatus in which variation in the angle between the main axis of the slider and the tangent to the track is kept within a range of 1.5 degrees so that writing/reading can be satisfactorily performed even if the recording density is made higher.

SUMMARY OF THE INVENTION

In the present invention, these purposes, as well as others which will be apparent, are achieved generally by providing a hard disk apparatus which includes a magnetic disk having a recording region, a magnetic head having a slider for recording data on the magnetic disk, a spindle motor for driving the magnetic disk, a head drive mechanism for shifting the magnetic head to a desired track position on the magnetic disk, a base plate on which the spindle and drive mechanism are mounted, and a top cover for hermetically sealing the base plate. Air is introduced between the slider and the magnetic head such that the head floats over the disk to write and read data on the disk. An air filter is provided on the surface of the base plate to remove dust within the apparatus.

According to the invention, the slider has a main axis which is skewed at an innermost circumferential portion of the recording region relative to a radial direction of the disk, so that the floating height of an edge portion of the slider toward the center of the magnetic disk and the floating height of an edge portion thereof toward the outermost circumference are virtually equal to each other.

Other objects, features and advantages of the present invention will be apparent when the detailed description of the preferred embodiments of the invention are considered in conjunction with the drawings which should be construed in an illustrative and not limiting sense as follows:

BRIEF DESCRIPTION OF DRAWINGS

FIGS. 1 to 3 are for explaining an embodiment of the present invention, in which FIG. 1 is an explanatory drawing of angles of skew of the slider at the innermost circumferential portion and outermost circumferential portion of the recording region;

FIG. 2 is an exploded drawing in perspective showing the whole of the hard disk apparatus;

FIG. 3 is a graph of characteristic curves showing relationship between angle of skew and floating height of the slider;

DESCRIPTION OF INVENTION IN RELATION TO DRAWINGS

An embodiment of the present invention will be described below with reference to the accompanying drawings.

Figure 4:
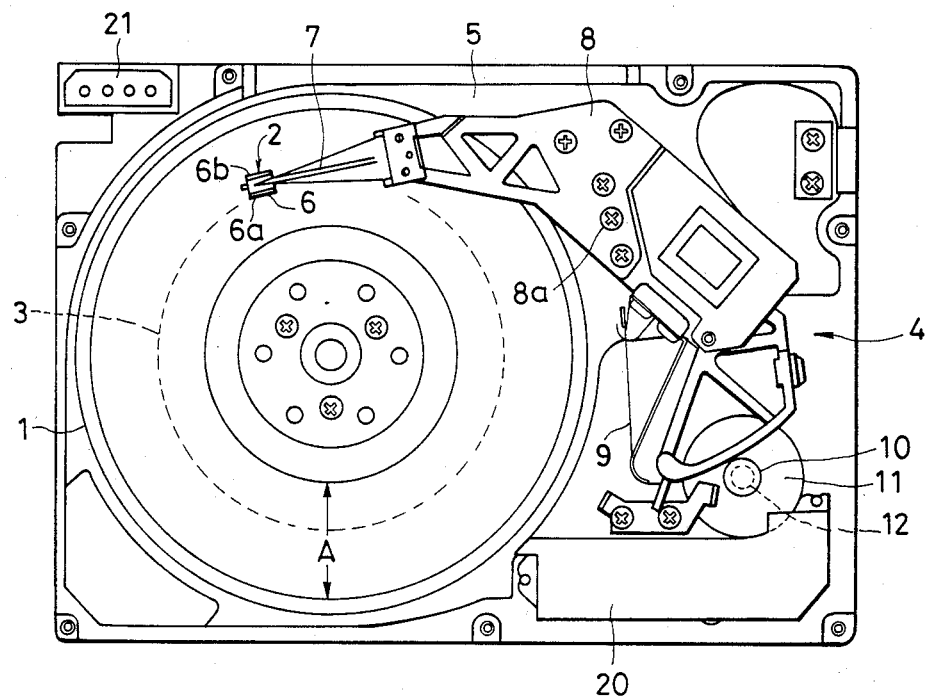
FIG. 4 is a plan view showing the hard disk apparatus with its top cover removed.

The hard disk apparatus as shown in FIG. 4 principally comprises a magnetic disk 1 as a data recording medium having a recording region A within a predetermined width in its radial direction provided thereon, a magnetic head 2 having a slider 6 placed in a coil (not shown) and for recording and reproducing data on the magnetic disk 1, a spindle motor 3 for rotationally driving the magnetic disk 1, a drive mechanism 4 for shifting the magnetic head 2 to predetermined track positions over the magnetic disk 1, a base plate 5 which receives the magnetic disk 1, magnetic head 2, etc. and on which the spindle motor 3 and drive mechanism 4 are mounted, and a top cover 14 for hermetically sealing the base plate 5.

Figure 2:
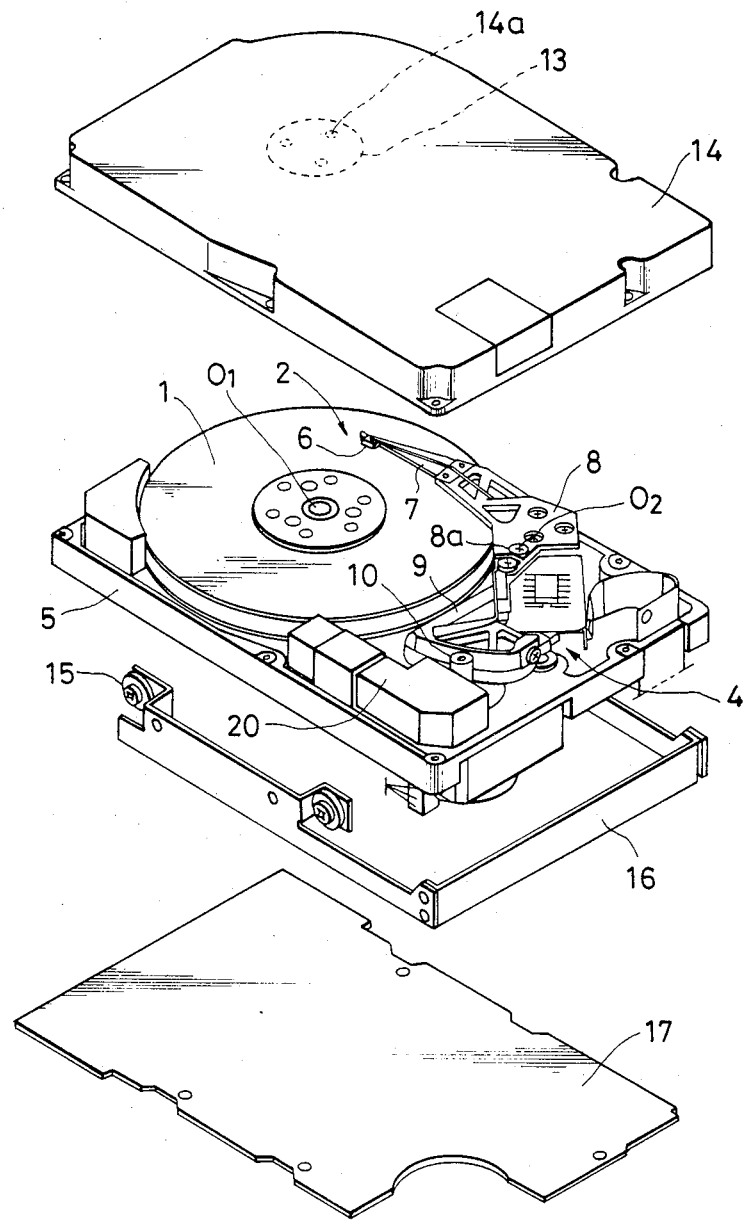

The above mentioned magnetic head 2 is called the in-line type read/write head, and since in the present hard disk apparatus there are provided two sheets of magnetic disks 1 each having the recording regions A formed on both sides thereof, four pieces of the magnetic heads 2 are used, one for each side attached to a swing arm 8 of the head drive mechanism 4 through a cantilever support spring 7. The head drive mechanism 4 is made up of the swing arm 8, a steel belt 9 attached to the swing arm 8 on the side opposite to the side where the magnetic head is attached, a pulley 10 around which the middle portion of the steel belt 9 is wound, and a stepping motor 11. The pulley 10 around which the steel belt 9 is wound is fixedly put on a drive shaft 12 of the stepping motor 11, and the swing arm 8 is adapted to be swingable around a pivot shaft 8a driven by the stepping motor 11. And, the center of gravity of the swing arm 8 is adapted to be virtually coincident with the center $O_2$ of the pivot shaft 8a. The housing accommodating the magnetic disk 1, magnetic head 2, swing arm 8, steel belt 9, pulley 10, etc. is formed of the base plate 5 and top cover 14 as shown in FIG. 2, and in order to keep airtightness, gaskets are used in the contact portion between the base plate 5 and the top cover 14 and the mounting portion of the stepping motor 11 and magnetic fluid is filled in the shaft portion of the spindle motor 3. In a portion of the top cover 14, there is made an opening portion 14a to equalize air pressures inside and outside the sealed chamber and this opening portion is provided with a filter 13 to prevent dust from entering into the sealed chamber. Further, the base plate 5 is attached to a frame 16 through rubber vibration isolators 15, and to the frame 16 on the side opposite to that where the base plate is attached, there is mounted a printed circuit board 17 with the motor drive circuit and control circuit formed thereon.

There is provided an air filter 20 on the surface of the base plate 5 at the side where the magnetic disk 1 is disposed. The air filter 20 is disposed lengthwise on the opposite side to the magnetic head 2 with reference to the center of rotation $O_1$ of the magnetic disk 1 and adapted to be led out upon rotation of the magnetic disk 1 in the direction of the circumference so that the air flowing along the side face of the top cover 14 is sucked in as much as possible and thereby the dust removing efficiency is improved. At one corner on the side where the base plate 5 is disposed, namely, at the top left-hand corner of FIG. 4, there is disposed upright a male connector of a power supply connector 21 of power supply means for supplying driving currents to the spindle motor 3, stepping motor 11, and the control circuit. This position where the male connector is disposed is, when the hard disk apparatus is incorporated in a system, brought to the position apart from the front panel, and it provides easy connection with a female connector at the time of mounting since nothing to interfere with the connection is present thereabout.

In the hard disk apparatus structured as described above, when the magnetic disk 1 is at rest, the magnetic head 2 touches its surface exerting approximately 10 g of contact force on the same, but when the spindle motor 3 is driven and the magnetic disk 1 is thereby rotated in a high speed in the direction of the arrow B, the air over the surface of the magnetic disk 1 rotates together with the magnetic disk 1 on account of its viscosity and flows into the space under the slider 6 introduced from the side of the support spring 7, and as a result, the slider 6 is provided with buoyancy. As the slider 6 is thus floated with the rotation of the magnetic disk 1, the drive shaft 12 of the stepping motor 11 is rotated through a predetermined angle to rotate the pulley 10, whereby the swing arm 8 is swung by means of the steel belt 9 in parallel with the magnetic disk 1. Thus, the magnetic head 2 (the slider 6) attached to the swing arm 8 is transported to predetermined track positions within the recording region A, where recording or reproduction of data is carried out. The reason for selection of the rotational direction to cause the air to flow in from the side of the support spring 7 (the direction as indicated by the arrow B) is not to apply any force in the direction to buckle the support spring 7. By such arrangement, the support spring 7 is enabled to follow the movement of the slider 6 without exerting any unnecessary force on the same.

Figure 3:
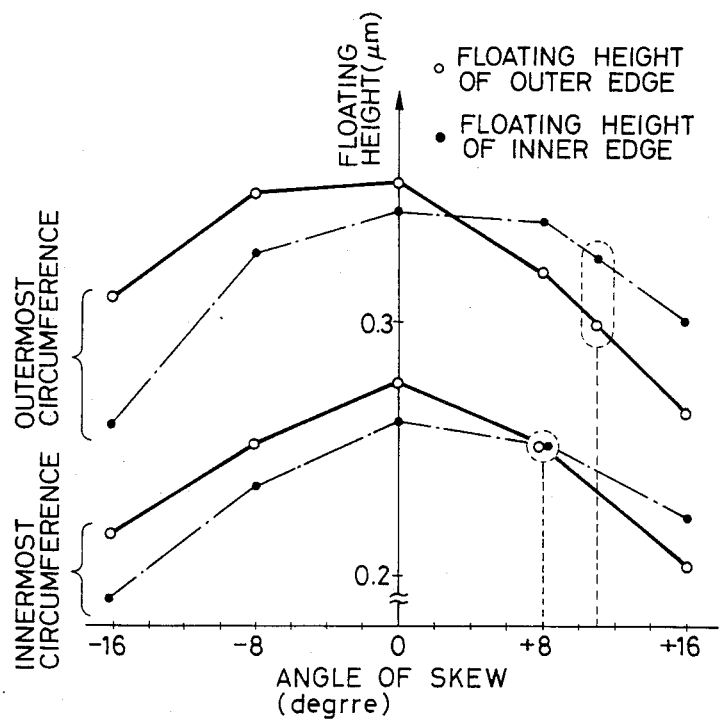

FIG. 3 provides results of measurement made to investigate the relationship between angles of skew $\alpha$, $\beta$ of the slider 6 at the innermost and outermost circumferential portions of the recording region of the disk of a diameter of 3.5 inches and the floating height. Floating heights of the slider 6 at the inner edge are plotted by solid circles and floating heights at the outer edge are plotted by hollow circles. The angle of skew, i.e., the angle of obliquity of the slider 6 with respect to the radial direction of the disk, represents the angle formed between the line $l_2$, which connects the intesection $6d$ of the main axis $l_1$ of the slider 6, extending through the gap of the magnetic head 2, and the air inflow edge $6c$ of the slider 6 with the center of rotation $O_1$ of the magnetic disk 1, and the air inflow edge $6c$. And, the angle of skew in the present case is attached with + sign when the obliquity is toward the inner circumferential side of the magnetic disk and with − sign when the obliquity is toward the outer circumferential side.

As shown in FIG. 3, if the angle of skew $\alpha$ at the innermost circumferential portion of the recording region A is set at approximately +8 degrees, the slider 6 exhibits equal floating heights at its inner edge $6a$ and outer edge $6b$, and it is thereby known that the danger of the edge of the slider 6 colliding with the magnetic disk in rotation can be avoided. And, when the angle of skew $\alpha$ at the innermost circumferential portion is set at approximately +8 degrees and then the swing arm 8 is swung to shift the slider 6 to the outermost circumferential portion of the recording region A, the angle of skew $\beta$ there becomes approximately +11 degrees. At this time, the slider 6 exhibits a larger floating height at its inner edge $6a$ than at its outer edge $6b$, that is, the same floats over that portion inclined to the outer circumferential side of the magnetic disk 1 (refer to FIG. 3), but since the circumferential speed at the outermost circumferential portion of the recording region A is higher, and hence, the floating height of the slider 6 becomes larger, there is no danger of the slider 6 to collide with the magnetic disk 1 even if it is inclined.

Figure 1:
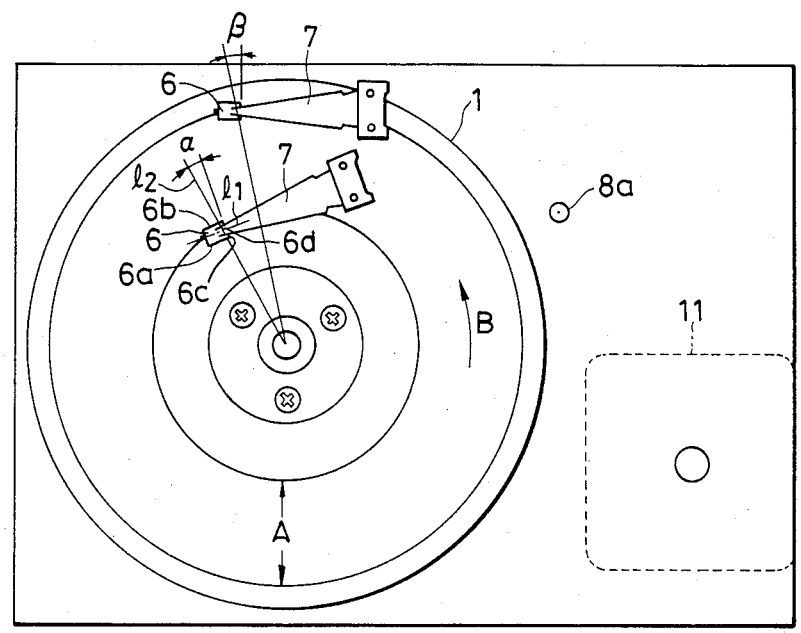

Therefore, in the present embodiment, as shown in FIG. 1, the slider 6 is attached to the support spring 7 so that the angle of skew $\alpha$ at the innermost circumferential portion may become +8.3 degrees, and the angle of skew $\beta$ at the outermost circumferential portion of the recording region A of the slider 6, brought there swung by the swing arm 8 around the pivot shaft $8a$, is +11.1 degrees. By such arrangement, at the innermost circumferential portion of the recording region A where the circumferential speed is minimized, the floating height of the inner edge $6a$ and that of the outer edge $6b$ of the slider 6 can be set virtually equal to each other, and therefore, the serious accident of the slider 6 colliding with the magnetic disk 1 in rotation to damage the record surface can be prevented for sure and the reliability is improved.

Incidentally, the angle of skew $\alpha$ at the innermost circumferential portion is set at the value of 8 degrees or thereabout in the above described embodiment depending on various factors such as diameter and number of revolutions of the magnetic disk 1 and shape of the slider 6, but it is a matter of course that the angle of skew $\alpha$ is variable depending on changes in the conditions of such factors.

Now, in another embodiment, in order that the angle between the gap of the magnetic head 2 and the tangent to the track may not be different so much between at the innermost circumferential portion and the outermost circumferential portion of the recording region A, the distance X between the center $O_2$ of the pivot shaft $8a$ and the center $O_1$ of the magnetic disk 1 and the distance R between the center $O_2$ of the pivot shaft $8a$ and the above mentioned intersection $6d$ are determined appropriately.

Figure 5:
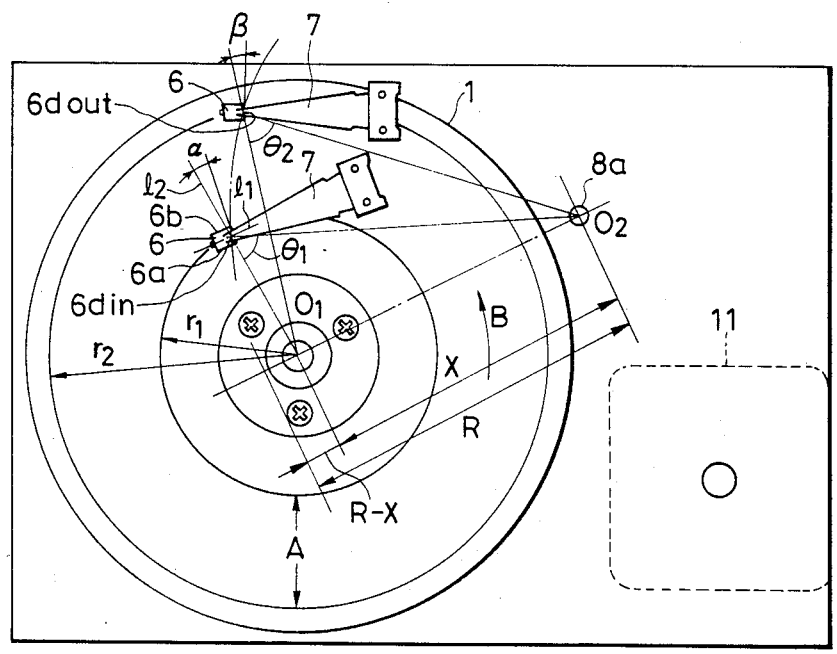
FIG. 5 is an explanatory drawing of overhang in the hard disk apparatus according to another embodiment of the present invention.

That is, now, as shown in FIG. 5, the distance from the center of rotation $O_1$ of the magnetic disk 1 to the innermost track of the recording region A and the distance from the center of rotation $O_1$ to the outermost track of the recording region A are expressed by $r_1$ and $r_2$, respectively, and the angle seen from the above mentioned intersection $6d$ on the magnetic head 2 at the innermost circumferential position and included between the center of rotation $O_1$ of the magnetic disk 1 and the center $O_2$ of the pivot shaft $8a$ is expressed by $\Theta_1 (=\angle O_1\ 6d_{in}\ O_2)$ and the angle seen from the above mentioned intersection $6d$ at the outermost circumferential position and included between the mentioned center of rotation $O_1$ and the mentioned center $O_2$ is expressed by $\Theta_2 (=\angle O_1\ 6d_{out}\ O_2)$. And if the law of cosines is applied to $\Delta O_1\ 6d_{in}\ O_2$ and $\Delta O_1\ 6d_{out}\ O_2$, then we obtain for $\Delta O_1\ 6d_{in}\ O_2$, $$X^2 = R^2 + r_1^2 - 2Rr_1 \cos \Theta_1 \tag{1}$$

and for $\Delta O_1\ 6d_{out}\ O_2$, $$X^2 = R^2 + r_2^2 - 2Rr_2 \cos \Theta_2. \tag{2}$$

By transforming these equations, we obtain $$\cos \Theta_1 = \frac{R^2 + r_1^2 - X^2}{2R\ r_1} \tag{3}$$

and $$\cos \Theta_2 = \frac{R^2 + r_2^2 - X^2}{2R\ r_2} \tag{4}$$

If, here, the above mentioned angles in the innermost circumferential position and the outermost circumferential position, $\Theta_1$ and $\Theta_2$, are let be equal to each other, we obtain $$(R^2+r_1^2-X^2)/2Rr_1 = (R^2+r_2^2-X^2)/2Rr_2. \tag{5}$$

To obtain R from this, $$R^2 = X^2 + r_1 r_2,$$

and since $r_1$, $r_2$, X each are positive quantities, $$R = \sqrt{(X^2 + r_1 r_2)}. \tag{6}$$

Using thus obtained distance R, we can obtain the angle $\Theta$ in any position in the recording region A as a function of the distance r from the center of rotation $O_1$ of the magnetic disk 1 from $$\Theta = \cos^{-1} \frac{R^2 + r^2 - X^2}{2Rr} \tag{7}$$

Here, from that R is obtainable as the square root of $X^2 + r_1 r_2$, it is known that $$R > X \tag{8}$$

always holds. This indicates that the distance R between the above mentioned intersection $6d$ and the center $O_2$ of the pivot shaft $8a$ is larger than, or overhanging, the distance between the center of rotation $O_1$ of the magnetic disk and the above mentioned center $O_2$.

In this connection, since values obtained by actual measurement on the hard disk apparatus as shown in FIG. 5 are $r_1 = 23.5$ cm, $r_2 = 42.5$ cm, and $X = 56.5$ cm, $R = 64.73$ cm is obtained from the above equation (6). Based upon this, the position r of the magnetic head 2, the angle $\Theta$ seen from the intersection 6d and included between the center of rotation $O_1$ of the magnetic disk 1 and the center $O_2$ of the pivot shaft 8a, and the angle of skew $\alpha$ are obtained by actual measurement as shown in Table 1.

TABLE 1

| r (cm) | $\Theta$ (degrees) | $\alpha$ (degrees) |
|---|---|---|
| 23.5 | 59.4 | 8.3 |
| 27.0 | 60.4 | 7.3 |
| 31.0 | 60.8 | 6.9 |
| 35.0 | 60.8 | 7.0 |
| 39.0 | 60.1 | 7.6 |
| 42.5 | 59.4 | 8.3 | r: Distance from center of rotation of magnetic disk to intersection of main axis $l_1$ of slider and air inflow edge.
$\Theta$: Angle seen from intersection of main axis $l_1$ of slider 6 and air inflow edge and included between center of rotation of magnetic disk $O_2$ and center of pivot shaft $O_2$
$\alpha$: Angle of skew.

As seen also from Table 1, if the distance R from the center $O_2$ of the pivot shaft 8a to the intersection 6d of the main axis $l_1$ of the slider 6 and the air inflow edge 6c is obtained from equation (6) and $\Theta$ at the innermost circumference and the outermost circumference of the recording region A is obtained from equation (7) and $\Theta = 59.4$ degrees is set, the angle $\Theta$ only becomes $\Theta = 60.8$ degrees at the maximum while the magnetic head 2 seeks. Therefore, the maximum variation during that course becomes 1.4 degrees, as obtained from the difference between both the values.

During that course, the angle of skew $\alpha$ varies from 8.3 degrees to 6.9 degrees and its variation also becomes 1.4 degrees. Since this angle of skew $\alpha$ is considered to be virtually equal to the deviation of the main axis $l_1$ of slider 6 from the tangent to the track as the object, if $\Theta$ and $\alpha$ at the innermost circumference of the recording region A are selected as described above, the angle of obliquity of the gap of the magnetic head 2 with respect to the track can be restricted within 1.4 degrees.

In the embodiment of FIG. 1, on the other hand, the actual measurement value of the distance R is 62.5 cm. Based upon this value, the angle of skew $\alpha$ varies from 8.1 degrees to 11.1 degrees and the variation becomes 3.0 degrees.

TABLE 2

| r (cm) | $\Theta$ (degrees) | $\alpha$ (degrees) |
|---|---|---|
| 23.5 | 64.5 | 8.3 |
| 27.0 | 64.7 | 8.1 |
| 31.0 | 64.4 | 8.4 |
| 35.0 | 63.7 | 9.1 |
| 39.0 | 62.7 | 10.1 |
| 42.5 | 61.7 | 11.1 |

Therefore, when the angle of skew $\alpha$ is set so that the floating heights of the slider 6 at its both edge portions 6a and 6b at the innermost circumference of the recording region A may be equal, by appropriately selecting the distance R between the center $O_2$ of the pivot shaft 8a and the slider 6, i.e., the amount of overhang of the magnetic head 2, the variation in the angle of obliquity of the gap of the magnetic head 2 with respect to the track can be restricted within a maximum of 1.4 degrees while the magnetic head 2 is shifted from the innermost circumference to the outermost circumference. Therefore, stabilized writing/reading operations all over the recording region A is made possible.

Thus, when the distances X and R are selected and the angle of skew $\alpha$ is set as described above, it is desirable in miniaturizing the hard disk apparatus to adopt arrangement of head gimbal assembly of an in-line type in which the direction of the main axis $l_1$ of the slider 6 and the support spring 7 attached to the swing arm 8 for supporting slider 6 are the same. This is because, under the condition of the housing limited in its dimensions, it is almost impossible to provide the distances X and R and the angle $\Theta$ satisfying equations (6) and (7) by the normal type in which the main axis $l_1$ of the slider 6 and the main axis of the support spring 7 are at virtually right angles to each other.

According to the embodiments of the present invention as described so far, various effects are obtained as follows:

(1) Since the angle of skew $\alpha$ is set to the angle providing the slider 6 with the same floating heights at its inner edge 6a and outer edge 6b when the magnetic head 2 is in the innermost circumferential position of the recording region A, there is no danger of the edge of the slider 6 abutting on the recording surface to damage the record data.

(2) In the present embodiments, while the amount of overhang is set with reference to the air inflow edge 6c of the slider 6, by selecting likewise the amount of overhang, i.e., the distance (R−X), appropriately, the angle of deviation of the gap of the magnetic head can be kept within 1.4 degrees.

(3) Since the magnetic head 2 including the slider 6 and the stepping motor 11 are located in virtually symmetrical positions with reference to the pivot shaft 8a, the driving portion and the driven portion are well balanced with each other and strained designing can be avoided.

(4) Since an air filter 20 is disposed at the air discharge side where the air is discharged by rotation of the magnetic disk 1, the dust filtering efficiency of the air filter 20 is high.

(5) Since the power supply connector 21 is arranged exposed at a corner outside the housing, connection with the power source at the time of mounting is easy.

What is claimed is:

1. In a magnetic disk apparatus having a magnetic disk with a recording region provided thereon within a predetermined width in a radial direction, a magnetic head with a gap provided at an air outflow edge side and provided with a slider formed integral therewith, a swing arm for supporting the magnetic head for swinging virtually in parallel with the surface of the magnetic disk, said slider having a main axis which is perpendicular to an air inflow edge of said slider, a pivot for pivotally supporting the swing arm, swing drive means for swingingly driving the swing arm, rotational drive means for rotationally driving the magnetic disk about its center, a housing for housing the magnetic disk, magnetic head, and swing drive means for the swing arm in a hermetically sealed condition, an air filter to remove dust within the housing, and drive power supply means for supplying drive currents to the swing drive means and rotational drive means, the slider being floated as a result of high speed rotation of the magnetic disk by the rotational drive means, so that data is read and written on the recording region, wherein the length of said swing arm and the position of said pivot are such that the distance between the pivot and the center of the magnetic disk and the distance between the pivot and the intersection of the main axis of the slider and the air inflow edge are such that the magnitudes of an angle between a line connecting the pivot and the intersection of the main axis of the slider and the air inflow edge and a line connecting the center of rotation of the magnetic disk and the intersection of the main axis of the slider and the air inflow edge at the time when the magnetic head is located at the innermost circumferential portion of the recording region and at the time when the magnetic head is located at the outermost circumferential portion are substantially the same.

2. A magnetic disk apparatus according to claim 1, wherein the distance between the pivot of the swing arm and the magnetic head is larger than the distance between the pivot and the center of rotation of the magnetic disk.

3. A magnetic disk apparatus according to claim 1, wherein the direction of the main axis of the slider and the direction of the main axis of the support arm attached to the swing arm for supporting the slider are virtually parallel.

4. A magnetic disk apparatus according to claim 1, wherein the air inflow side to the slider is provided on the side toward the swing arm.

5. A magnetic disk apparatus according to claim 1, wherein the magnetic disk and the swing drive means for the swing arm are disposed at virtually symmetrical positions with reference to the pivot.

6. A magnetic disk apparatus according to claim 1, wherein the air filter is disposed on a side opposite to the side where a magnetic head is disposed with reference to the center of rotation of the magnetic disk and along a lengthwise edge portion of the housing.

7. A magnetic disk apparatus according to claim 1, wherein a power supply connector at a terminal of the drive power supply means is disposed at one corner outside the housing on a side where the magnetic disk is disposed.

* * * * *